United States Patent [19]

Nook et al.

[11] 3,737,550

[45] June 5, 1973

[54] METHOD FOR TREATING INFLUENZA VIRAL INFECTIONS

[75] Inventors: Mary A. Nook; Harold E. Renis, both of Kalamazoo; Gerald E. Underwood, Galesburg, all of Mich.

[73] Assignee: The Upjohn Company, Kalamazoo, Mich.

[22] Filed: Oct. 28, 1971

[21] Appl. No.: 193,566

Related U.S. Application Data

[63] Continuation of Ser. No. 884,316, Dec. 11, 1969, abandoned, which is a continuation-in-part of Ser. No. 653,040, July 13, 1967, abandoned.

[52] U.S. Cl. ................................424/279, 424/283
[51] Int. Cl. ..............................................A61k 27/00
[58] Field of Search...........................424/279, 283

[56] References Cited

UNITED STATES PATENTS 3,033,877   5/1962   Veer...............................260/345.8

OTHER PUBLICATIONS

The Merck Manual, 1966, pages 774–777.
Tyrrell et al., Brit. J. of Exper. Pathol, Vol. 46, pages 370–75 (1965).

*Primary Examiner*—Jerome D. Goldberg
*Attorney*—Martin B. Barancik and John Kekich

[57] ABSTRACT

Pharmaceutical preparations supplying a non-toxic anti-influenza effective amount of a member selected from the group consisting of elenolide, elenolic acid, alkali metal salts of elenolic acid, alkaline earth metal salts of elenolic acid, iron elenolate, zinc elenolate, lower alkyl esters of elenolic acid, lower alkyl acetals of elenolic acid and lower alkyl acetal esters of elenolic acid are used intranasally for treating influenza in a mammal. The above active ingredients are used locally or topically for the treatment of influenza in an infected mammal.

5 Claims, No Drawings

3,737,550

METHOD FOR TREATING INFLUENZA VIRAL INFECTIONS

CROSS REFERENCE TO RELATED APPLICATION

This application is a continuation patent application of copending U.S. Ser. No. 884,316, filed Dec. 11, 1969, now abandoned which is a continuation-in-part of application Ser. No. 653,040, filed July 13, 1967, which is now abandoned.

BRIEF SUMMARY OF THE INVENTION

This invention relates to the use of pharmaceutical compositions in antiinfluenza processes. More particularly, the invention relates to the use of pharmaceutical preparations consisting essentially of elenolic acid and related compounds to treat influenza. The viruses parainfluenza 2 (croup associated); influenza A (PR-8) and parainfluenza 3 (HA-1) are inactivated.

DETAILED DESCRIPTION

It has been found in accordance with the present invention that the compositions and methods hereof are uniquely active antivirally in destroying the infectivity of influenza viruses. For example, with influenza virus A (PR-8), elenolic acid destroyed the infectivity of the virus at concentrations which did not have any effect on the hemagglutination or neuraminidase activity of the virus particle. The concentration of the essential active ingredient in the compositions and processes preferably is from about 50 $\mu$g./ml. to about 50 mg./ml. in a solution having a pH of from about 5.5 to about 7.7, preferably from about 6.0 to about 7.0 and especially from about 6.3 to about 6.7. When a buffer salt is used such as a phosphate salt, 0.05 to 0.1 M suffices to maintain the pH range. pH values of from about 7.0 to about 7.7 exist in the nasal and related areas where beneficial inactivation of viruses occurs with the present compositions and processes. The contact antiviral processes are effective at ambient temperature, for example room temperature, about 25° C., to about 37° C. and with this range. Generally the quantity of virus inactivated varies with the time allowed for inactivation to occur. Changes in sodium chloride concentration to the point of saturation were found to have no effect on the antiviral activity of the compositions and methods. Additionally, incubation of the essential active ingredient, for example, elenolic acid, with calf serum at about pH 8 did not appreciably affect the subsequent inactivation of virus. These and other data show that the compositions and methods of the present invention demonstrate unexpected beneficial contact activity against a broad spectrum of influenza viruses and moreover maintain this activity in the presence of concentrations of organic matter, for example in the presence of serum.

The aforesaid essential active ingredients of the present pharmaceutical preparations and processes are prepared according to the methods described in U.S. Pat. No. 3,033,877 and by Panizzi et al., Gass. Chim. Ital. 90: 1449–1485 (1960). For example, elenolide, elenolic acid, alkali metal salts of elenolic acid, such as ammonium, sodium, and potassium elenolates; alkaline earth metal salts, such as calcium elenolate, magnesium elenolate; iron elenolate; zinc elenolate; lower alkyl acetals of elenolic acid wherein the alkyl radical contains 1 to 6 carbon atoms inclusive, for example, methyl, ethyl, propyl, butyl, pentyl and hexyl and isometric forms thereof; lower alkyl acetal esters of elenolic acid wherein the alkyl radical is as given containing one to six carbon atoms, inclusive, for example methyl-O-methyl elenolate, ethyl-O-ethyl elenolate, isopropyl-O-isopropyl elenolate, and the like; and lower alkyl esters of elenolic acid wherein the alkyl contains one to six carbon atoms inclusive as given, for example, methyl ester, ethyl ester, propyl ester and the like.

The pharmaceutical preparations of the present invention are advantageously useful in pharmaceutical applications for they demonstrate unexpected activity as shown by their effectiveness in combating influenza viral activity. The methods of the present invention are advantageously useful, for they demonstrate unexpected pharmaceutical activity in inhibiting, combating and destroying influenza viral proliferation and development. The affinity of various influenza viruses for susceptible host cells is interfered with by the essential active ingredient in the pharmaceutical preparations. In uninhibited, that is untreated, influenza virus controls, a virus-susceptible cell affinity obtains where the virus attaches or adsorbs to the cell. The susceptible host cell, in a manner of speaking, is a substrate for the influenza virus such that interaction of the virus and the virus-susceptible host cell occurs. There apparently ensues penetration of the cell by the influenza virus and proliferation therein to such an extent that mature, developed virus, upon release, becomes a source of infectiveness for other cells and spread of the influenza viral infection. The aforesaid affinity of viruses for and associated effects on susceptible host cells are also exemplified by lysis of susceptible host cells and formation of plaques when cell monolayers are subjected to the virus and interaction is allowed to proceed without interruption or inhibition of viral development. However, when the affinity of the virus for the virus-susceptible host cell and their interaction are subjected to the inhibiting effect of the pharmaceutical preparations of the present invention, in some manner protection against the virus is achieved. Infectiveness is greatly reduced, and titers of the particular influenza virus are lowered. Viral proliferation and development and lysis of cells are effectively inhibited. In the area of combating influenza viral activity, the antiviral methods of the invention consist essentially of subjecting the interaction of the virus and a virus-susceptible host cell to a sufficient amount of the essential active ingredients for inhibition of said interaction, also, subjecting virus otherwise proliferating in susceptible host cells to a sufficient amount of the said essential active ingredient in the form of a pharmaceutical preparation for inhibition of proliferation of the virus. Additional anti-influenza viral methods consist essentially of subjecting a virus otherwise proliferating in susceptible host cells to a sufficient amount of the essential active ingredient for inhibition of the infectiveness of the virus. The anti-influenza viral methods of the present invention encompass methods which consist essentially of subjecting the virus in the presence of susceptible host cells to a sufficient amount of the aforesaid active ingredient for reduction of titers of the virus. Interference of the virus-cell reaction occurs.

The compositions of the present invention are presented in solid form, for example, tablets, powders, freeze dried solids, containing an effective amount for anti-influenza viral action of the essential active ingredient suitably prepared with an appropriate buffer readily soluble in water to provide in solution of pH of from about 5.5 to about 7.7, preferably pH of from about 6.0 to about 7.0, especially pH from about 6.3 to about 6.7. Inert solid diluents such as lactose and sodium chloride are operable in such solid forms. Similarly, aerosols of such solutions utilizing non-toxic liquid propellant-containing compositions prepared by methods known to those skilled in the art or such solutions alone as drops or sprays are effective in preventing infection with, or spread of, respiratory influenza viruses. Solutions and suspensions are adapted to form aerosols by their content of liquid normally gaseous propellants, for example, fluorocarbon propellants such as dichlorofluoromethane and dichlorotetrafluoromethane, nitrogen and carbon dioxide. (See, for example, U.S. Pat. Nos. 2,868,691 and 3,095,355.) The pharmaceutical preparations and processes are also useful in the oral area and related areas such as nasal passages, sinuses, larynx, trachea, bronchi and brachial tubes. Such usefulness resides in sprays, mists, nebulae and the like and especially in aerosols formed from propellant-containing pharmaceutical preparations. The essential active ingredient, preferably in a small particle size, for example less than about 5 microns, is dissolved or dispersed in a small amount of aqueous vehicle or hydroalcoholic vehicle or ethanol or aliphatic alcohol such as oleyl alcohol. Thereafter the solution or suspension is placed into a nebulizer or known types such as a mechanical nebulizer. Also, active ingredient is suspended in and intimately mixed with normally gaseous cooled liquid propellants such as the aforesaid fluorocarbon propellants. When packaged under pressure in a manner known to those skilled in the art, propellant-containing preparations constitute satisfactory pharmaceutical preparations adapted to form aerosols which effectively disperse the essential active ingredient in an infected area such as the mucous membrane-coated areas of the oral and nasal passages and related areas, such as sinuses, larynx, trachea, bronchi, and brachial tubes. Solutions and suspensions suitable in these pharmaceutical preparations and methods contain from about 0.05 mg/ml. up to about 50 mg/ml. The amount dispensed at any one time in the spray or aerosol can be metered and controlled in manners known to those skilled in the art to supply specified dosages, depending upon the severity of the virus condition and upon the time of use, prophylactically or currently with infection.

The following are examples of the manner and process of making and using the invention but are not to be construed as limiting.

Example 1   Reduction of Titer

Fifty hamsters (conditioned for 4 months and weighing 125 Gm) were distributed into 10 boxes of five hamsters each, five boxes making a group, to be compared to the other five boxes making the second group. Drug treatment was given to the hamsters in one box of the first group, followed by placebo given to the hamsters in the corresponding box of the second group; the procedure was repeated for the remaining four pairs of boxes. Exactly 10 minutes later, and using the same sequence, all hamsters were inoculated with $1 \times 10^4$ PFU (plaque-forming units) of HA-1 virus in 0.01 ml. volume, into the right nostril, without anesthesia. Exactly 10 minutes after the inoculation the hamsters received a second dose of either drug or placebo in the same sequence as indicated above.

The drug, elenolic acid, calcium salt, was given intranasally, without anesthesia, at the rate of 2 mg. in 0.1 ml. saline, 0.05 ml. of the drug solution into each nostril each time. Similar volumes of saline were given to the placebo-treated hamsters each time. Nose washes (2 ml. Hanks') were taken from all animals 24 hours post-infection. The animals were taken from each box at random and the samples were numbered sequentially in order to compare results obtained with nose washes of each pair of hamsters (i.e., No. 1 treated and No. 1 placebo, No. 2 treated and No. 2 placebo, etc.). These nose washes were inoculated to HEp-2 cell plates for viral count. Seventy-two hours post-infection the lungs from hamsters in two boxes selected at random in the treated group and from the two corresponding boxes in the placebo group were used to determine viral titer by the plaque method, using HEp-2 cell plates.

Results

A significant reduction of virus titers was obtained in the nose washes of the drug-treated hamsters. When the 25 pair were matched, it was observed that in every case the treated hamster yielded less virus than the corresponding hamster treated with placebo (Table 1).

Most remarkable results were obtained with lung material: no virus was recovered from the drug-treated animals, while all placebo-treated hamsters were positive (Table 2).

Table 1

PFU Counts of HA-1 Virus Per ml. of Nose Wash Obtained 24 hr. Post-Infection

| Box | Treatment Hamster No. | PFU/ml. | PFU/ml. | Placebo Saline Hamster No. | Box |
|---|---|---|---|---|---|
|   | 1  | 40  | 400  | 1  |   |
|   | 2  | 0   | 6000 | 2  |   |
| 1 | 3  | 26  | 440  | 3  | 2 |
|   | 4  | 238 | 420  | 4  |   |
|   | 5  | 0   | 5000 | 5  |   |
|   | 6  | 0   | 1600 | 6  |   |
|   | 7  | 66  | 1500 | 7  |   |
| 3 | 8  | 4   | 800  | 8  | 4 |
|   | 9  | 55  | 1040 | 9  |   |
|   | 10 | 5   | 2400 | 10 |   |
|   | 11 | 148 | 330  | 11 |   |
|   | 12 | 0   | 400  | 12 |   |
| 5 | 13 | 0   | 700  | 13 | 6 |
|   | 14 | 10  | 900  | 14 |   |
|   | 15 | 12  | 548  | 15 |   |
|   | 16 | 43  | 300  | 16 |   |
|   | 17 | 1   | 103  | 17 |   |
| 7 | 18 | 6   | 460  | 18 | 8 |
|   | 19 | 125 | 1040 | 19 |   |
|   | 20 | 7   |      | 20 |   |
|   | 21 | 61  | 355  | 21 |   |
|   | 22 | 3   | 240  | 22 |   |
| 9 | 23 | 0   | 310  | 23 | 10 |
|   | 24 | 13  | 154  | 24 |   |
|   | 25 | 0   | 148  | 25 |   |

Table 2

PFU Counts of HA-1 Virus Per Gram of Lung, 42 hr. Post-Infection

| Box | Treatment Hamster | $\times 10^3$ PFU/gm. Lung | $\times 10^3$ PFU/gm. Lung | Placebo Hamster | Box |
|---|---|---|---|---|---|
|   | A | 0 | 32  | A |   |
|   | B | 0 | 320 | B |   |
|   | C | 0 | 551 | C |   |
|   | D | 0 | 190 | D |   |
|   | E | 0 | 89  | E |   |

|   |   |   |     |   |   |
|---|---|---|-----|---|---|
| 7 | F | 0 | 230 | F |   |
|   | G | 0 | 100 | G |   |
|   | H | 0 | 100 | H | 8 |
|   | I | 0 | 50  | I |   |
|   | J | 0 | 13  | J |   |

The 20 animals above were tested for lung HA-1 virus and are the same as listed for the corresponding boxes in Table 1; but within each box the animals were not individually identified.

Example 2 Contact Reduction of Titer to Noninfectiousness

Undiluted HA-1 virus ($1 \times 10^7$ PFU/ml.) was contacted with elenolic acid as follows:

| | |
|---|---|
| Undiluted virus | 0.4 ml. |
| 0.5 M Phosphate buffer pH 8 | 0.1 ml. |
| 0.1% Elenolic acid, calcium salt (in 0.9% saline) | 0.5 ml. |

A similar mixture using saline instead of the drug was used as control. Both mixtures were incubated at 37°C. × 30 min. and then diluted to a final 1:10 dilution of the original virus. These 1:10 dilutions of the virus were used: (A) to inoculate hamsters (10 hamsters per mixture, 0.01 ml. intranasally, without anesthesia) and (B) to titrate residual infectious virus on HEp-2 cell monolayers after serial 10-fold dilutions.

Results

Incubation of the mixtures at 37°C. reduced the titer of the control (saline) mixture to $4 \times 10^6$ PFU/ml. and the titer of the treated mixture to $2 \times 10^3$ PFU/ml. Thus, the infectious titer was reduced by greater than 99.9 percent.

Consequently, each of the 10 hamsters inoculated with the drug-virus mixture received an average of 2 viable PFU which is in the range of infectivity. Nine of these hamsters were totally free of virus throughout the test, as determined by inoculating HEp-2 cell monolayers with undiluted nose washes taken from the first to the third day post-inoculation. One hamster was negative on the first day, but became positive thereafter. All 10 hamsters inoculated with the control mixture were infected. The results indicate that HA-1 virus inactivated by elenolic acid is noninfectious.

Elenolic acid inactivation of HA-1 virus appears to be irreversible. Each hamster received a total of $4 \times 10^3$ PFU whether viable (in the control group) or inactivated by the drug. Since each hamster inoculated with the elenolic acid-inactivated virus received two viable PFU, calculated, and although this level was insufficient for infection, any addition by reversion of inactivated virus to the infectious state would have resulted in more positive animals in this group.

Table

Irreversible Inactivation of HA-1 Virus by Calcium Elenolate

| Group | Hamster No. | HA-1 Virus Recovered | | |
|---|---|---|---|---|
| | | 24 Hr. PI | 48 Hr. PI | 72 Hr. PI |
| Virus + Calcium Elenolate | 1 | 0 | 0 | 0 |
| | 2 | 0 | 0 | 0 |
| | 3 | 0 | 0 | 0 |
| | 4 | 0 | 0 | 0 |
| | 5 | 0 | 0 | 0 |
| | 6 | 0 | 0 | 0 |
| | 7 | 0 | 0 | 0 |
| | 8 | 0 | 0 | 0 |
| | 9 | 0 | 6.* | 84.* |
| | 10 | 0 | 0 | 0 |
| | 1 | .048* | 40.* | 144.* |
| | 2 | .030 | 3. | 200. |
| | 3 | .124 | 3. | 14. |
| | 4 | 0.40 | 0 | 0 |
| Virus + Saline | 5 | .022 | 8. | 11. |
| | 6 | .052 | 3. | 60. |
| | 7 | .130 | 60. | 180. |
| | 8 | .060 | 24. | 140. |
| | 9 | .052 | 52. | 90. |
| | 10 | .050 | 16. | 28. |

PI = Post Infection
* $\times 10^3$ PFU HA-1 Virus Per ml. of Nose Wash

Example 3 Contact Inactivation of Viruses

Virus suspension incubated 4 hours at 37°C. with calcium elenolate at 1 mg/ml. Titer of residual infective virus is determined in roller tubes of HeLa cells and expressed as log $TCD_{50}$/ml in the following tabulation.

| Virus | Treated | Control |
|---|---|---|
| HA 1 | 0 | 4.2 |

$TCD_{50} = \log_{10}$ of number of 50% tissue culture infectious doses per ml. The 50% tissue culture infectious dose is that amount of virus which causes infection in one-half of a given number of culture tube tissue cultures.

Example 4 Contact Reduction of Virus Proliferation in Presence of Serum

Method: 1 part aqueous calcium elenolate solution plus 1 part calf serum was incubated at room temperature for 15 minutes. One part of undiluted virus was added and mixture was incubated further at room temperature for 15 minutes. Dilutions were made and inoculated onto monolayer plates of chick kidney cells. Plates were incubated at 37° C. for 48 hours and plaques were counted.

| | Virus PFU PR-8 |
|---|---|
| Elenolate (1 mg./ml.) | $1 \times 10^2$ |
| Control (in calf serum) | $1 \times 10^8$ |

Example 5 Prophylactic and Therapeutic Activity

Sixteen-gram mice were infected intranasally with 10 $LD_{50}$ of the PR-8 strain of influenza virus either before or after one intranasal treatment with calcium elenolate. The compound was administered at 0.1 mg./mouse in 0.05 ml. of sterile water.

| Treatment Time | $ST_{50}$ | % S | $\Delta ST_{50}$ | Δ% S |
|---|---|---|---|---|
| 3 hrs. prior | 134 | 21 | 5 | 6 |
| 2 hrs. prior | 136 | 24 | 8 | 9 |
| 1 hr. prior | 149 | 40 | 20 | 25 |
| 5 min. prior | 145 | 59 | 17 | 44 |
| 5 min. after | 124 | 47 | −5 | 32 |
| 1 hr. after | 130 | 59 | 1.4 | 44 |

$ST_{50}$ is the statistical time in hours at which 50 percent of the animals had died.
%S is the percent of survivors.
$\Delta ST_{50}$ is the extension of survival time $ST_{50}$ due to treatment.
Δ% S is the increase in %S due to treatment.

Example 6 Effect of Calcium Elenolate on the Infectivity and Hemagglutination of Influenza A (PR-8) Virus

| Conc. 1) | Infectivity 2) PFU/0.5 ml. | Hemagglutination titer 3) |
|---|---|---|
| .5 | $-10^{-1}$ | 32 |
| .25 | $<10^{-1}$ | 128 |
| .125 | $5 \times 10^1$ | 128 |
| .06 | $7 \times 10^2$ | 128 |
| .03 | $4.3 \times 10^3$ | 128 |
| 0 | $1.3 \times 10^4$ | 128 |

1. Prepared in 0.9% NaCl. Each reaction tube contained 1 ml. elenolate solution at the appropriate concentration, 1 ml. virus suspension and 0.1 ml. phosphate buffer (pH 8.0, 0.5M). The reaction mixture was incubated at 37° C. for 30 minutes.

2. Serial 10-fold dilutions of the reaction mixture were made in Hanks' solution and the resulting infectivity was determined by the plaque method on chicken kidney monolayers.

3. The titer was determined on serial two-fold dilutions of the reaction mixture with chicken red blood cells. The reciprocal of the highest dilution giving definite hemagglutination is recorded.

Example 7  Antiviral Activity of Elenolide

To 0.5 ml. of a suspension of HA-1 virus at about $10^4$ PFU/ml. in Hank's solution, was added 0.5 ml. of a solution of elenolide at 1 mg./ml. in saline (0.9 percent). The mixture was incubated at 37° C. for 30 minutes, then diluted 1:100 with Hanks' solution and plated on HE-2p monolayers. No plaques were seen, indicating that essentially no HA-1 virus had survived treatment with elenolide.

Example 8  In vivo Reduction of Titer when Elenolate is Administered after Infection In this example, elenolate was administered intranasally at twelve and fourteen hours after intranasal infection of hamsters with HA-1 virus. Ten male hamsters weighing 80 to 90 Gm. each were distributed into two boxes, five to a box. At the start of the test (0 hours) each hamster was infected intranasally without anesthesia by spraying 0.01 ml. of a suspension of HA-1 virus into the right nostril. Twelve hours, and again 14 hours later, 0.05 ml. of a solution of calcium elenolate, 1.0 mg. in 0.1 ml. of 0.9 percent saline, was sprayed into each nostril. In the control group, 0.05 ml. of saline without drug was instilled as a placebo. At 17 and 32 hours, nose washes of each animal were taken by rinsing the nasal cavity with 2 mls. of Hanks's solution. Titers of HA-1 in the nose washes were measured as plaque-forming units on HEp-2 tissue cell plates.

Results

At 17 hours, virus titers were:

| Treatment | $\times 10^3$ PFU/ml. nose wash | | | | | | | | | |
|---|---|---|---|---|---|---|---|---|---|---|
|  | 1 | 2 | 3 | 4 | 5 | 6 | 7 | 8 | 9 | 10 |
| Elenolate | 0 | 0 | 7 | 0 | 1 | 38 | 1 | 2 | 0 | 2 |
| Control | 0 | 125 | 11 | 0 | 71 | 255 | 57 | 236 | 18 | 94 |

At 32 hours, virus titers were:

| Treatment | $\times 10^3$ PFU/ml. nose wash | | | | | | | | | |
|---|---|---|---|---|---|---|---|---|---|---|
|  | 1 | 2 | 3 | 4 | 5 | 6 | 7 | 8 | 9 | 10 |
| Elenolate | 3.2 | 0 | 14.0 | 6.0 | 19.2 | 18.0 | 1.4 | 7.2 | 2.6 | 0 |
| Control | 0 | 11.0 | 5.2 | 0 | 11.9 | 21.4 | 16.0 | 34.0 | 3.4 | 13.6 |

Example 9  Aqueous Solution 600 ml. of aqueous pharmaceutical preparation is prepared as follows, each ml. containing 0.1 mg. of calcium elenolate.

| | | |
|---|---|---|
| Calcium elenolate | | 60 mg. |
| Sodium chloride | | 5400 mg. |
| Sodium hydroxide, 5% | q.s. | q.s. |
| Water for injection | q.s.-ad | 600 ml. |

The calcium elenolate and sodium chloride are dissolved in 550 ml. of the water for injection. The pH is adjusted to 6.3 with sodium hydroxide solution. The volume is adjusted and the resulting solution is sterile filtered and for convenience in handling and using, is filled 10.5 ml. in each 10 ml. vial. The vials are plugged and capped.

When required for use in combatting influenza viral infection in mucous membrane coated areas, this solution is nebulized into the nasal area.

Other similarly beneficial solutions contain, for example 0.05 mg, 0.5 mg, 1.0 mg., 2.5 mg., 5 mg., 10 mg., 20 mg. and 50 mg. per ml. In these solutions the amount of sodium chloride will vary as well as the amount of sodium hydroxide. In the 50 mg./ml. solution, sodium chloride is omitted whereas in the 20 mg. solution about 5.2 mg. of sodium chloride is used per ml.

Example 10  Freeze Dried Solid Preparation

Approximately 2,000 vials of freeze-dried pharmaceutical preparation are prepared as follows.

| | | |
|---|---|---|
| Calcium elenolate | | 26 gm. |
| Sodium chloride | | 173 gm. |
| Sodium hydroxide, 5% | | q.s. |
| Water for injection | q.s.-ad | 2000 ml. |

The calcium elenolate and sodium chloride are dissolved in 1,500 ml. of the water for injection. The pH is adjusted to 6.6 with q.s. of the sodium hydroxide solution. The volume is adjusted and the resulting solution, adjusted to volume, is sterile filtered and aseptically filled 1.0 ml. into each sterile vial. The vials are frozen and dried from the frozen state. At the time of use each vial is reconstituted to an aqueous solution with 10 ml. of sterile water for injection. This solution is useful as a spray or in the form of a nebulized mist in the pharyngeal area.

Example 11  Aerosol (fluorocarbon propellant)

A normally gaseous liquid propellant mixture of dichlorodifluoromethane (about 50 Gm.) and dichlorotetrafluoroethane (about 75 Gm.) is prepared, using cooling as required. Calcium elenolate, particle size about 2.5 microns, is suspended therein to provide a suspension containing 0.05 mg. of active ingredient per milliliter. This suspension is kept uniformly mixed and filled into individual pressurized, metered dispensing containers for preparation of an aerosol for inhalation as required.

Example 12  Additional Preparations and Processes

By substituting for the calcium elenolate and elenolide of the above examples, the other essential active ingredients, like-wise-effective preparations and process are obtained, for example elenolic acid, ammonium elenolate, sodium elenolate, magnesium elenolate, iron elenolate, zinc elenolate, lower alkyl acetals wherein the alkyl radical has one to six carbon atoms inclusive, for example methyl acetal, ethyl acetal, propyl acetal, isopropyl acetal, and the like; and lower alkyl acetal esters wherein the alkyl radical has one to six carbon atoms inclusive, for example, methyl-O- methyl elenolate, ethyl-O-ethyl elenolate, isopropyl-O-isopropyl elenolate, and the like; lower alkyl esters of elenolic acid, for example, wherein the alkyl has one to six carbon atoms inclusive, such as methyl, ethyl, propyl, butyl, pentyl and hexyl esters.

We claim:

1. A method for treating influenza in a mammal which comprises administering intranasally to said mammal a pharmaceutical preparation supplying a nontoxic anti-influenza effective amount of a member selected from the group consisting of elenolic acid, elenolide, alkali metal salts of elenolic acid, alkaline earth metal salts of elenolic acid, iron elenolate, zinc elenolate, lower alkyl acetals of elenolic acid wherein the alkyl radical has 1 to 6 carbon atoms, inclusive, lower alkyl acetal esters of elenolic acid wherein the alkyl radical has 1 to 6 carbon atoms, inclusive, lower alkyl esters of elenolic acid wherein the alkyl radical has one to six carbon atoms, inclusive.

2. A method in accordance with claim 1 wherein the pharmaceutical preparation includes a compatible buffer adapted to provide a pH of from about 5.5 to about 7.7.

3. A method in accordance with claim 2 wherein the administration is prophylactic.

4. A method for treating influenza in an infected mammal which comprises administering locally or topically to said infected mammal a pharmaceutical preparation supplying a non-toxic anti-influenza effective amount of a member selected from the group consisting of elenolic acid, elenolide, alkali metal salts of elenolic acid, alkaline earth metal salts of elenolic acid, iron elenolate, zinc elenolate, lower alkyl acetals of elenolic acid wherein the alkyl radical has one to six carbon atoms, inclusive; lower alkyl acetal esters of elenolic acid wherein the alkyl radical has one to six carbon atoms, inclusive; lower alkyl ester of elenolic acid wherein the alkyl radical has one to six carbon atoms, inclusive.

5. A method in accordance with claim 4 wherein the pharmaceutical preparation includes a compatible buffer adapted to provide a pH of from about 5.5 to about 7.7.

* * * * *